US012619790B2

(12) United States Patent
Tian et al.

(10) Patent No.: US 12,619,790 B2
(45) Date of Patent: May 5, 2026

(54) DATA WRITING METHOD, RECOVERY METHOD, AND READING METHOD, AND CORRESPONDING APPARATUS

(71) Applicant: Alipay (Hangzhou) Information Technology Co., Ltd., Hangzhou (CN)

(72) Inventors: Hongliang Tian, Hangzhou (CN); Qingsong Chen, Hangzhou (CN); Shaowei Song, Hangzhou (CN); Shoumeng Yan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 51 days.

(21) Appl. No.: 18/936,791

(22) Filed: Nov. 4, 2024

(65) Prior Publication Data

US 2025/0190633 A1     Jun. 12, 2025

(30) Foreign Application Priority Data

Dec. 8, 2023   (CN) .......................... 202311689327.X

(51) Int. Cl.
*G06F 21/78* (2013.01)
*G06F 16/11* (2019.01)
(Continued)

(52) U.S. Cl.
CPC ............ *G06F 21/78* (2013.01); *G06F 16/128* (2019.01); *G06F 21/602* (2013.01); *G06F 21/6218* (2013.01)

(58) Field of Classification Search
CPC ...... G06F 21/78; G06F 16/128; G06F 21/602; G06F 21/6218; G06F 21/64; G06F 21/80
See application file for complete search history.

(56) References Cited

U.S. PATENT DOCUMENTS

| 2017/0147838 | A1* | 5/2017 | Alon ........................ G06F 21/64 |
| 2021/0064547 | A1* | 3/2021 | Chhabra ............. G06F 11/1068 |

FOREIGN PATENT DOCUMENTS

| CN | 118551419 A | 8/2024 |
| CN | 119576226 A | 3/2025 |
| CN | 119719030 A | 3/2025 |

* cited by examiner

*Primary Examiner* — Huan V Doan
(74) *Attorney, Agent, or Firm* — Seed IP Law Group LLP

(57)          ABSTRACT

Implementations of the present specification provide a data writing, data recovery, and data reading method, and a corresponding secure disk apparatus. The data writing method includes following: User data blocks are first written into a write cache, and a plurality of user data blocks identified by LBAs are read from the write cache under a certain condition. For each user data block, an HBA is allocated to the user data block, authenticated encryption is performed on the user data block to generate an encrypted data block and authentication information, and first metadata corresponding to the user data block is generated, where the first metadata is organized in a form of a KV pair and includes the LBA, the HBA, and the authentication information. A plurality of write commands for the plurality of user data blocks are submitted to a host disk for the disk to store the encrypted data block based on the corresponding HBA. In addition, the first metadata corresponding to each user data block is further written into a first metadata table maintained by using an LSM tree. Then, a synchronization operation command is sent to the LSM tree and the host disk for the LSM tree and the host disk to complete data write persistence.

24 Claims, 6 Drawing Sheets

(51) Int. Cl.
    *G06F 21/60*           (2013.01)
    *G06F 21/62*           (2013.01)

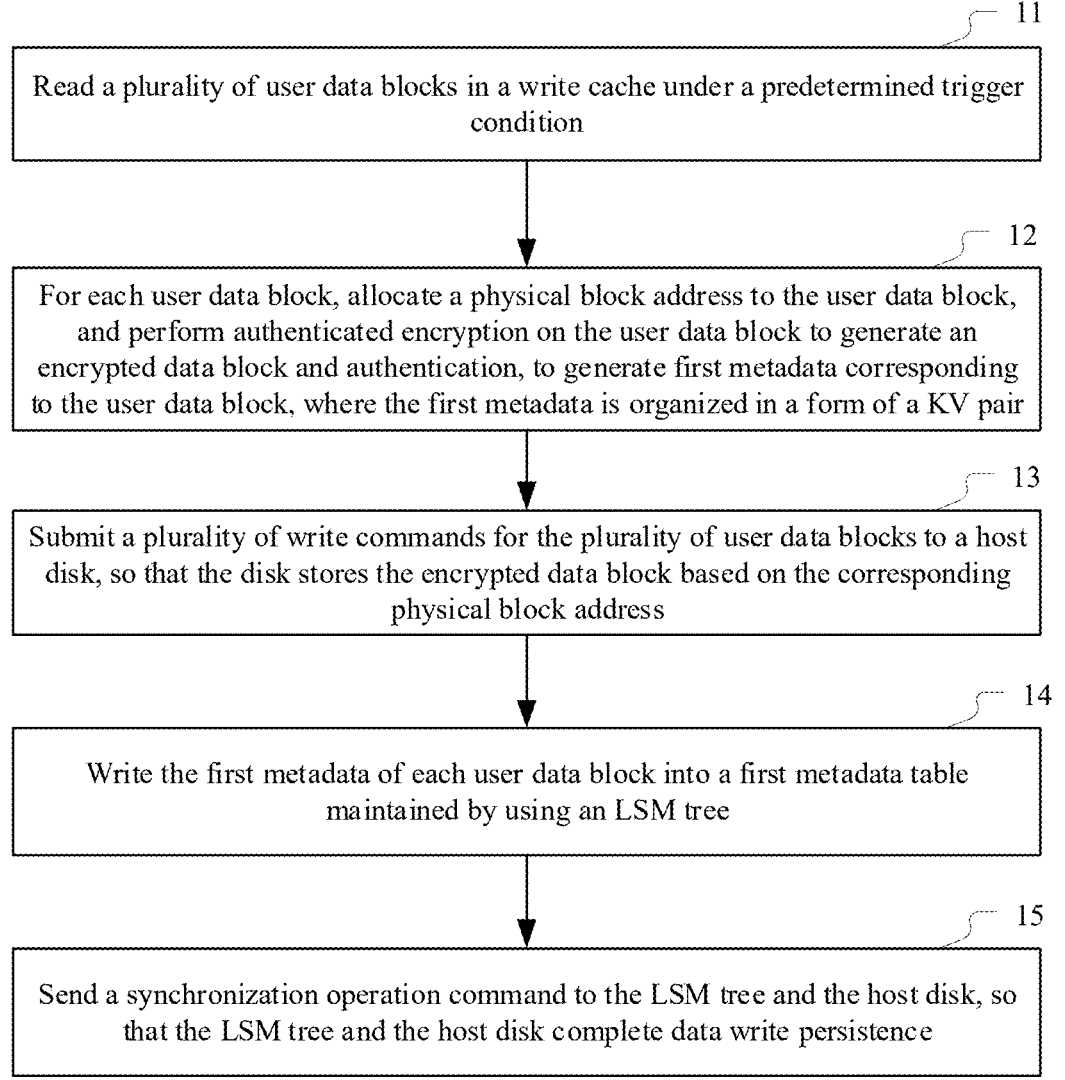

11

Read a plurality of user data blocks in a write cache under a predetermined trigger condition

12

For each user data block, allocate a physical block address to the user data block, and perform authenticated encryption on the user data block to generate an encrypted data block and authentication, to generate first metadata corresponding to the user data block, where the first metadata is organized in a form of a KV pair

13

Submit a plurality of write commands for the plurality of user data blocks to a host disk, so that the disk stores the encrypted data block based on the corresponding physical block address

14

Write the first metadata of each user data block into a first metadata table maintained by using an LSM tree

15

Send a synchronization operation command to the LSM tree and the host disk, so that the LSM tree and the host disk complete data write persistence

FIG. 1

| Data content | User data | | Snapshot data | Log | Journal |
|---|---|---|---|---|---|
| Encryption format | Authenticated encryption | | Cryptoblob | CryptoLog | CryptoChain |
| Storage area | BlockSet | | | BlockLog | |

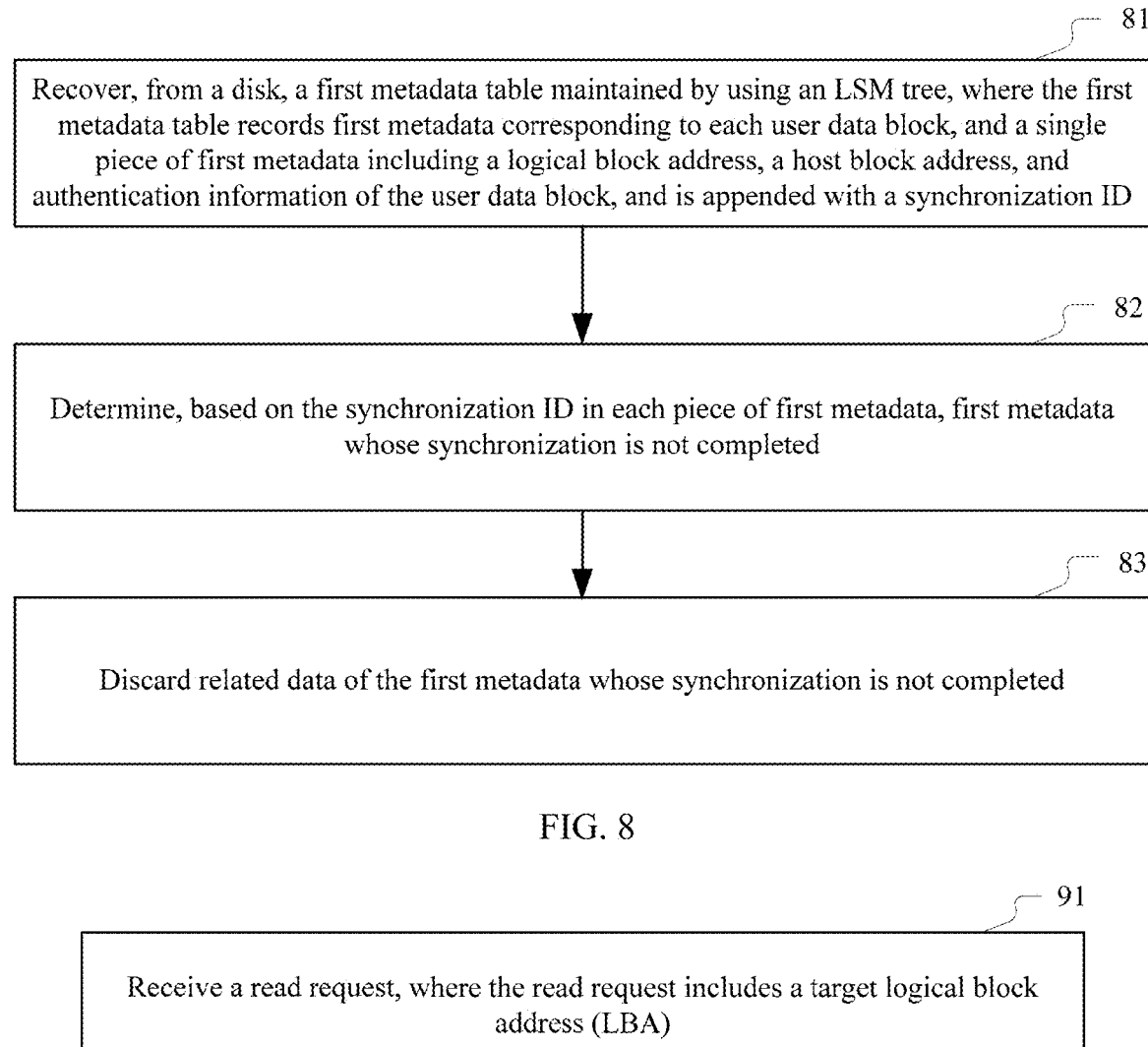

81

Recover, from a disk, a first metadata table maintained by using an LSM tree, where the first metadata table records first metadata corresponding to each user data block, and a single piece of first metadata including a logical block address, a host block address, and authentication information of the user data block, and is appended with a synchronization ID

82

Determine, based on the synchronization ID in each piece of first metadata, first metadata whose synchronization is not completed

83

Discard related data of the first metadata whose synchronization is not completed

Receive a read request, where the read request includes a target logical block address (LBA)

92

Query a first metadata table by using the target LBA as a key to read target metadata, where the target metadata further includes a target host block address (HBA) and target authentication information

93

Read an encrypted data block from a disk based on the target HBA, and decrypt and authenticate the encrypted data block based on the target authentication information to obtain a user data

FIG. 9

DATA WRITING METHOD, RECOVERY METHOD, AND READING METHOD, AND CORRESPONDING APPARATUS

TECHNICAL FIELD

One or more implementations of the present specification relate to the field of data reading/writing security in a computer, and in particular, to a secure data writing method and reading method, and a data reading/writing management apparatus.

BACKGROUND

With development of computing technologies in various industries and an increase in a quantity of cloud and terminal users, a large amount of data is stored in various computer devices. As the industry develops, increasing more attention is paid to device and data security. To ensure security of devices and data, various architecture vendors also respectively propose their own solutions. For example, a secure encrypted virtualization (SEV) technology, or a software guard extension (SGX) technology are used for improving data or device security. These solutions provide users with secure trusted execution environments (TEEs) for confidentially storing and processing data, to prevent the data from being damaged by untrusted kernels and conventional application programs.

SUMMARY

The specification provides technical solutions that, among others, improve disk data security.

One or more implementations of the present specification describe a secure virtual disk solution, and a method and apparatus for performing data writing, data recovery, and data reading based on the secure virtual disk. The solution can, among others, enhance protection of disk data security.

According to an aspect, a data writing method is provided, including: reading a plurality of user data blocks in a write cache under a predetermined trigger condition, where each user data block is identified by a logical block address (LBA) of the user block; for each user data block, allocating a host block address (HBA) to the user data block, performing authenticated encryption on the user data block to generate an encrypted data block and authentication information, and generating first metadata corresponding to the user data block, where the first metadata is organized in a form of a key-pair (KV) pair and includes the LBA, the HBA, and the authentication information; submitting a plurality of write commands for the plurality of user data blocks to a host disk for the disk to store the encrypted data block in a first storage area of the disk based on the corresponding HBA; writing the first metadata corresponding to each user data block into a first metadata table maintained by using a log-structured merge (LSM) tree; and sending a synchronization operation command to the LSM tree and the host disk for the LSM tree and the host disk to complete data write persistence.

According to an aspect, a data recovery method is provided, including: recovering, from a disk, a first metadata table maintained by using an LSM tree, where the first metadata table records first metadata corresponding to each user data block, and each piece of first metadata includes an LBA, an HBA, and authentication information of the user data block, and is appended with a synchronization ID; determining, based on the synchronization ID in each piece of first metadata, first metadata whose synchronization is not completed; and discarding related data of the first metadata whose synchronization is not completed.

According to an aspect, a data reading method is provided, including: receiving a read request, where the read request includes a target LBA; querying a first metadata table by using the target LBA as a key to read target metadata, where the target metadata further includes a target HBA and target authentication information, and the first metadata table is maintained by using an LSM tree and records metadata corresponding to each user data block; and reading an encrypted data block from a disk based on the target HBA, and decrypting and authenticating the encrypted data block based on the target authentication information to obtain the user data block.

According to an aspect, a data writing apparatus is provided, including: a reading unit, configured to read a plurality of user data blocks in a write cache under a predetermined trigger condition, where each user data block is identified by an LBA of the user block; a generation unit, configured to: for each user data block, allocate an HBA to the user data block, perform authenticated encryption on the user data block to generate an encrypted data block and authentication information, and generate first metadata corresponding to the user data block, where the first metadata is organized in a form of a KV pair and includes the LBA, the HBA, and the authentication information; a first writing unit, configured to submit a plurality of write commands for the plurality of user data blocks to a host disk for the disk to store the encrypted data block in a first storage area of the disk based on the corresponding HBA; a second writing unit, configured to write the first metadata corresponding to each user data block into a first metadata table maintained by using an LSM tree; and a synchronization unit, configured to send a synchronization operation command to the LSM tree and the host disk for the LSM tree and the host disk to complete data write persistence.

According to an aspect, a data recovery apparatus is provided, including: a recovery unit, configured to recover, from a disk, a first metadata table maintained by using an LSM tree, where the first metadata table records first metadata corresponding to each user data block, and each piece of first metadata includes an LBA, an HBA, and authentication information of the user data block, and is appended with a synchronization ID; a determining unit, configured to determine, based on the synchronization ID in each piece of first metadata, first metadata whose synchronization is not completed; and a discarding unit, configured to discard related data of the first metadata whose synchronization is not completed.

According to an aspect, a data reading apparatus is provided, including: a receiving unit, configured to receive a read request, where the read request includes a target LBA; a querying unit, configured to query a first metadata table by using the target LBA as a key to read target metadata, where the target metadata further includes a target HBA and target authentication information, and the first metadata table is maintained by using an LSM tree and records metadata corresponding to each user data block; and an acquisition unit, configured to read an encrypted data block from a disk based on the target HBA, and decrypt and authenticate the encrypted data block based on the target authentication information to obtain the user data block.

According to an aspect, a computing device is provided, including a storage and a processor. The storage stores executable code, and when executing the executable code, the processor implements the method according to the first aspect to the third aspect.

In the solutions provided in the implementations of the present specification, a secure disk, or referred to as a secure virtual disk, implemented by using a hierarchical log structure is proposed. Security of the secure disk is implemented by using a plurality of layers of log-based data structures. An increasingly more advanced storage function and/or a new abstract data structure with a stronger security attribute are/is added to each layer based on an abstract data structure provided at a lower layer, thereby achieving higher levels of security and functionality layer by layer. It can be verified that the secure disk implemented in such a hierarchical manner can satisfy core security requirements for data: write confidentiality and read correctness, and have comprehensive CIFCAI security. In addition, the secure disk solution can resist a rollback attack.

BRIEF DESCRIPTION OF DRAWINGS

To describe the technical solutions in the implementations of the present invention more clearly, the following is a brief introduction of the accompanying drawings for illustrating such technical solutions. Clearly, the accompanying drawings described below are merely some implementations of the present invention, and a person of ordinary skill in the art can still derive other drawings from such accompanying drawings without making innovative efforts.

FIG. 1 is a flowchart illustrating a data writing process according to an implementation;

FIG. 8 is a flowchart illustrating a data recovery process based on a secure disk according to an implementation;

FIG. 9 is a flowchart illustrating a data reading method according to an implementation;

DESCRIPTION OF EMBODIMENTS

Figure 2:
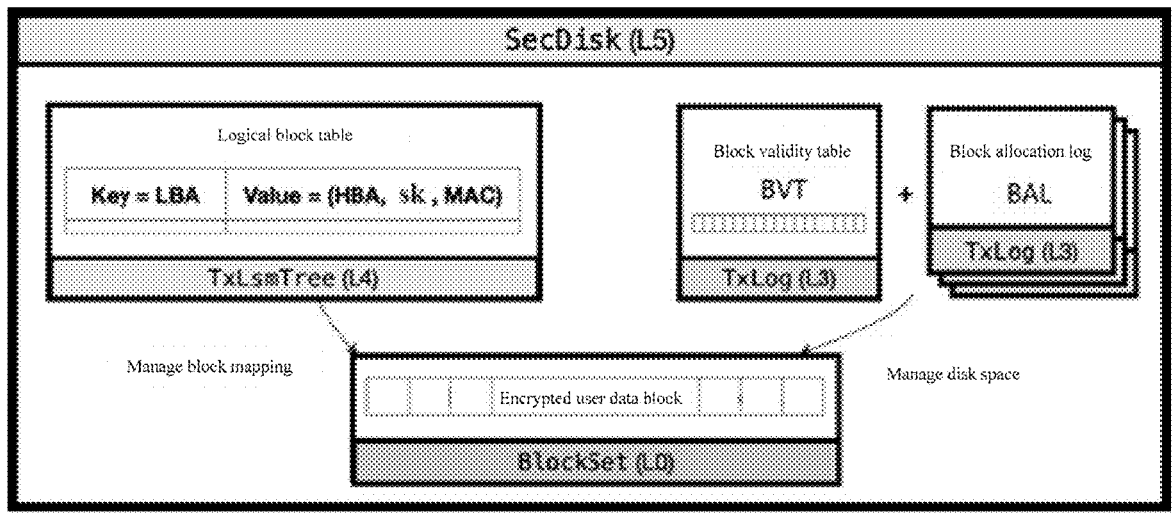
FIG. 2 is a schematic diagram illustrating a data structure at an L5 layer of a secure disk.

The following describes the solutions provided in the present specification with reference to the accompanying drawings.

Before the solutions in the implementations are described, related technical terms are first explained and described.

A trusted execution environment (TEE) is an emerging hardware-based security technology. The TEE enables a user to run a sensitive application program in a dedicated memory area that cannot be pried or tampered with by a privileged opponent.

A software guard extension (SGX) is a group of instruction code used to implement some TEEs built in some central processing units (CPUs).

A file system is usually abbreviated as FS, which is a method and a data structure that are used by an operating system (OS) to control a data storage and retrieval manner.

A message authentication code (MAC), sometimes referred to as an authentication label, is a small segment of information used to perform identity verification and integrity check on a message.

A Merkle hash tree (MHT), or referred to as a Merkle tree, is a binary tree, where each leaf is a hash of a data block, and each internal node is a hash of two concatenated subnodes of the internal node.

A log-structured merge tree, also referred to as an LSM tree or LSMT, is a data structure for storing a key-value (KV) pair, and can provide fast indexing and access to a large quantity of inserted files.

As described above, to protect data security, a TEE solution is proposed. Modern TEEs can be classified into two types: an Enclave-based TEE or a virtual machine (VM)-based TEE. The Enclave-based TEE creates an isolated and encrypted memory area in a user process, and the VM-based TEE applies memory isolation and encryption to protect a VM on a potentially malicious hypervisor.

Although TEE hardware can protect data in a memory, it provides insufficient protection for data in a disk.

If a privileged opponent controls an untrusted host disk and a lifecycle of the TEE, various attacks may be launched, including but not limited to an eavesdropping attack (stealing data), a tampering attack (modifying data), a crash attack (forcing the TEE offline), a playback attack (replacing new data with old data when the TEE is online), and a rollback attack (replacing an entire disk state with an old disk state when the TEE is offline). The rollback attack is more challenging to defense of the TEE than the playback attack, because memory data is lost when the TEE is offline, and the data in the TEE cannot be used for attack detection and defense.

For example, in a related TEE technology, a variant of the MHT is used to verify data security. The MHT is a layered tree structure in which a leaf node stores data, and each non-leaf node protects its subnodes by maintaining its encryption key and MAC. The MHT ensures confidentiality, integrity, and freshness of an entire file. However, if the TEE crashes or restarts, a root MAC of the MHT is lost. When the TEE is offline, the entire disk may be reversed by the rollback attack.

In the implementations of the present specification, a secure disk implemented by using a layered log structure, or referred to as a secure virtual disk, is proposed. Security of the secure disk is implemented by using a plurality of layers of log-based data structures. In some implementations, as an illustrative example, the secure disk can be formed by six layers, which can be marked as or divided into L0 to L5 from a low layer to a high layer. An increasingly more advanced storage function and/or a new abstract data structure with a stronger security attribute are/is added to each layer based on an abstract data structure provided at a lower layer, thereby achieving that layer by layer, a higher layer has a higher level of security and a higher level of functionality than a lower layer.

It can be understood that in an existing OS, a low-level system kernel communicates with a physical disk by invoking an interface provided by the disk, to write data into or read data from the disk. This part of function can be abstracted as a devicemapper. In a Linux system, the devicemapper is a logical volume management subsystem provided by the system, which allows establishment of a mapping relationship between a physical storage device and a logical volume, and is one of important storage management components. To implement functions of the secure virtual disk, according to the implementations of the present specification, data/a manner for invoking the disk interface by the devicemapper can be modified to control and manage a data structure stored in the disk, thereby implementing a secure virtual disk with a layered log structure.

The specification describes, as illustrative examples, a data structure, a function, and a security feature at each layer of a secure disk with reference to a data writing process.

FIG. 1 is a flowchart illustrating a data writing process according to an implementation. In the data writing process, generated user data is first stored in a write cache in units of logical blocks. It should be noted herein that the user data herein refers to data from a file system at an upper layer of an OS. The "user" mentioned subsequently is not an individual end user, but refers to an upper layer of a file system or an OS, that is, a user of a devicemapper.

In an implementation, the write cache is a memory segment with an identified size in a TEE. It can be understood that, in a TEE system, a secure segment is divided from a memory and belongs to the TEE. Data stored in the secure segment has security guarantee provided by the TEE. Alternatively or additionally, the write cache can be a cache located in the TEE. As such, the user data stored in the write cache is located in the TEE, and security of the data is ensured.

According to operation S11 in FIG. 1, a plurality of user data blocks in a write cache are read in response to a predetermined trigger condition, where each user data block is identified by a logical block address (LBA) of the user data block. The trigger condition can be receiving a synchronization operation instruction or an instruction indicating that the write cache is full. In other words, when the synchronization operation instruction Sync is received, or when the write cache is full, the user data block is read from the write cache to prepare for synchronization to a disk. Generally, the synchronization operation instruction Sync herein can be sent by a user (for example, a file system) or an OS.

Next, in operation S12, for each user data block, a physical address including a host block address (HBA) is allocated to the user data block, authenticated encryption are performed on the user data block to generate an encrypted data block and authentication information, and first metadata corresponding to the user data block is generated. The first metadata is organized in a form of a KV pair, and includes the LBA, the HBA, and the authentication information.

For example, for any user data block U, in one aspect, an HBA is allocated to the user data block U. Therefore, block allocation information can be maintained to record an allocation state of a block space in the disk. An idle physical block in a current block space can be learned by querying the block allocation information, and is allocated to a current user data block U. After the allocation, the block allocation information further needs to be modified to record an updated latest block allocation state. In an implementation, the block allocation information includes a block validity table (BVT) and a block allocation log (BAL). The BVT records, in a form of a bitmap, whether each block is currently occupied, and the BAL is configured to record events that a block is allocated and deallocated (recycled). Several BALs are periodically merged to update the BVT.

In an aspect, for a user data block U, a random encryption key sk is used to encrypt the user data block U by using an authenticated encryption algorithm to generate an encrypted data block EnU and a MAC. The MAC and the encryption key sk are used to perform authentication on the encrypted data block EnU, and are referred to as authentication information of the data block. In an example, in the above described operation, an AES-GCM encryption algorithm is used to generate the encrypted data block EnU and the MAC. According to the encryption algorithm, plaintext is split into a plurality of segments, which are encrypted segment by segment and then encrypted results are aggregated. In other examples, various existing authenticated encryption algorithms can be used to implement the above encryption and generation of the MAC.

The above information determined for the user data block U forms metadata of the data block U. For clarity and distinction, the information is referred to as first metadata. The first metadata can be organized in a form of a key-value pair, and includes the LBA, the HBA, and the authentication information of the data block U. For example, the first metadata can be written in the following KV pair form:

Key=LBA, Value=(HBA, sk, MAC)

For example, Key in the first metadata is the LBA of the data block U, and Value includes the HBA, the encryption key, and the MAC.

Next, in operation S13, a plurality of write commands for the plurality of user data blocks are submitted to a host disk for the disk to store the encrypted data block in a first storage area of the disk based on the corresponding HBA.

For example, if n user data blocks U1, U2, . . . , Ui, and Un are read in operation S11, a command sequence submitted in operation S13 includes n write instructions W1, W2, . . . , Wi, and Wn. The write instruction Wi corresponding to the user data block Ui includes an HBA corresponding to the data block Ui for the disk to store an encrypted data block EnUi corresponding to the data block Ui in a storage location indicated by the HBA.

In addition, in operation S14, the first metadata is written into a first metadata table maintained by using an LSM tree. The LSM tree is a data structure usually used by many file systems to maintain KV pair data. A maintenance manner combined with this operation is described in detail below.

In some implementations, operation S14 is performed after it is ensured that the disk executes the above write command sequence in operation S13. Alternatively or additionally, in an implementation, operations S13 and S14 can be performed in parallel or performed in no particular order.

After the first metadata is written into the LSM tree, in operation S15, a synchronization operation command is sent to the LSM tree and the host disk for the LSM tree and the host disk to complete data write persistence. The synchronization operation command is sent to the LSM tree for the LSM tree structure to perform recording and completes the current synchronization operation. The synchronization operation command is submitted to the host disk for the disk to ensure that all data written this time is persisted.

A data structure and a data state at each layer in the data writing process with reference to a multi-layer data structure of a secure disk.

FIG. 2 is a schematic diagram illustrating a data structure at an L5 layer of a secure disk. As shown in the figure, when a user data block is written into the disk from the write cache, an HBA is allocated to the user data block based on the block allocation information formed by the BVT and the BAL, and the block allocation information is updated. In addition, an encrypted data block and authentication information (sk and a MAC) corresponding to the user data block are further generated through authenticated encryption. Based on the information, first metadata of the user data block is generated, that is, a KV pair: (Key=LBA, Value= (HBA, sk, MAC)).

The first metadata in the form of the KV pair is added to a logical block table (that is, the first metadata table), and the data table is maintained by using an LSM tree. For example, a data structure of the LSM tree that stores the first metadata is maintained at an L4 layer.

In an aspect, at an L0 layer, untrusted physical blocks in the disk are organized as a plurality of storage areas with different properties. Different storage areas support data encrypted in different encryption formats, and data is written by using different interfaces. For example, the storage areas with different properties include a BlockSet and a BlockLog. The BlockSet is used to store data in a block-shaped encryption format and is suitable for storing a user data block. The BlockLog is used to store various types of encryption information in the LSM tree, which is described in detail below. Therefore, at the L5 layer, the encrypted data block corresponding to the user data block is stored in a first storage area whose property is the BlockSet.

The BVT and the BAL can be recorded in a form of a log. For example, the BVT is in a form of a bitmap, and bit values in the bitmap can be serialized to form a log. The BAL is used to record each block allocation/deallocation event, and each event can correspond to a 0/1 change of a bit in the bitmap. Each event is recorded as a log. After an HBA is allocated to a user data block U, a log reflecting the allocation event needs to be added to the BAL. To save the disk space, a current BVT and a BAL after the BVT can be merged periodically to generate a new BVT. The log is maintained at an L3 layer.

The specification includes maintenance of the data structure. The following describes such maintenance of the data structure for the layers.

Figure 3:
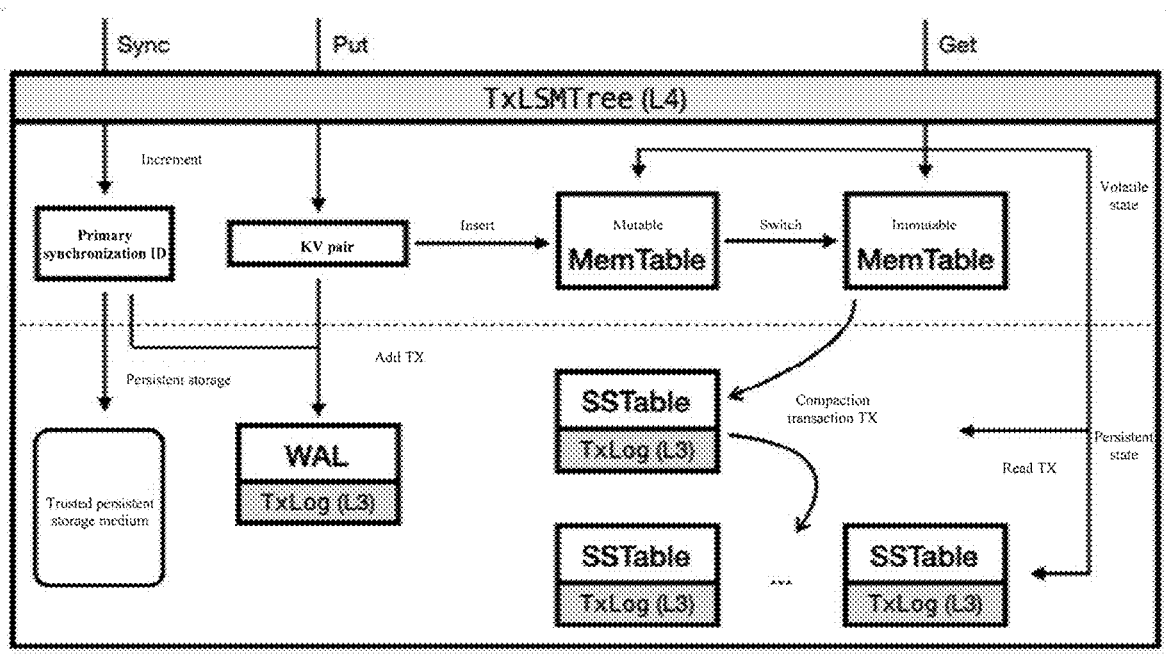
FIG. 3 is a schematic diagram illustrating a data management structure at an L4 layer of a secure disk.

FIG. 3 is a schematic diagram illustrating a data management structure at an L4 layer of a secure disk. As in some illustrative examples described herein, the L4 layer is mainly used to maintain the first metadata table in the form of the LSM tree.

Referring to FIG. 3, a main workflow of the LSM tree follows a workflow of a modern LSM tree. Initially, a new KV pair is buffered or added to a memory component named a Mem Table, and the component can be considered as a temporary table maintained in a memory. According to an implementation of the solution, the Mem Table is also located in a TEE segment of the memory. When a size of the MemTable increases beyond a threshold, the mutable (active) MemTable is converted into an immutable state, and KV pairs in the immutable Mem Table are sorted in an order of Keys in the KV pairs to form a sorted string table (SST or SSTable), and then persisted to the disk. This process is referred to as minor compaction. To recycle the disk space and enhance a query processing capability, the SST is organized into a plurality of file levels in a persistent medium (disk), and capacities of these file levels increase exponentially. Minor compaction generates the SST at a highest level $l_0$ (to distinguish from a data structure layer of the secure disk, a file level stored in the SST is represented in lowercase herein). Once a number of SSTs at a level $l_i$ exceeds a threshold, some SSTs from levels $l_i$ and $l_{i+1}$ are selected for merging and sorting, to generate a new SST at the level $l_{i+1}$ to replace old SSTs. Such an operation is referred to as major compaction. To prevent data in Mem Tables from losing, a new KV pair is also added to a write-ahead log (WAL).

All operations in the LSM tree, for example, inserting a KV pair, reading a KV pair, writing a WAL, and an inter-SST compaction operation, have features (that is, ACID) of a transaction (Tx for short). Therefore, the LSM tree can be referred to as a TxLsmTree. Accordingly, the L4 layer can also be referred to as a (Tx) LSM tree layer.

The maintenance manner and the workflow of the above LSM tree are consistent with those of an existing LSM tree. A difference lies in the following: KV pair content processed by the existing LSM tree is user data, but the KV pair maintained by the TxLsm Tree in FIG. 3 is metadata corresponding to a user data block, as shown in the logical block table in FIG. 2. When n user data blocks in the write cache are written into the disk, n metadata KV pairs are generated for the n data blocks, and are added to the LSM tree.

The WAL is in a form of a log, and the metadata KV pair is written into the WAL by appending a log. Insertion of a KV pair into the SST and a compaction Tx correspondingly generated by the SST constitute an SST operation Tx, which generates an SST operation Tx log. Therefore, the KV pair is also inserted into the SST in a form of a log. Log data is maintained at the L3 layer.

As shown in FIG. 3, a primary synchronization ID is introduced into the TxLsm tree. It can be seen that the TxLsm tree in FIG. 3 has a Sync interface and a Put interface. The Put interface is used to input a KV pair, and the Sync interface is used to receive a synchronization operation command Sync. As described in operation S15, each time encrypted data of a batch of user data blocks is stored in the disk and metadata is written into the LSM tree, a synchronization operation command Sync is sent to the LSM tree. In response to the command, the primary synchronization ID is incremented once, for example, incremented by 1. The primary synchronization ID is stored in an independent trusted persistent storage device other than the disk. The storage device can be a third-party trusted storage or even a blockchain system.

In an aspect, when the metadata KV pair of each user data block is added to the LSM tree in operation S14, a current synchronization ID, that is, a current value of the primary synchronization ID, is first read, the synchronization ID is appended to each KV pair, and then the KV pair is written into the WAL and inserted into the Mem Table. In an example, the synchronization ID can be appended to the value in the KV pair in a form of a suffix or another form. When compaction is performed subsequently based on the Memtable and the SST, the synchronization ID is always appended to the KV pair.

It should be understood that, in each data writing and synchronization process, as shown in FIG. 1, the metadata KV pair is first written into the LSM tree before the synchronization operation command Sync is sent to the LSM tree. Therefore, a synchronization ID read by the metadata KV pair is a value incremented after a previous round of synchronization but before an increment in a current round of synchronization.

Figure 4:
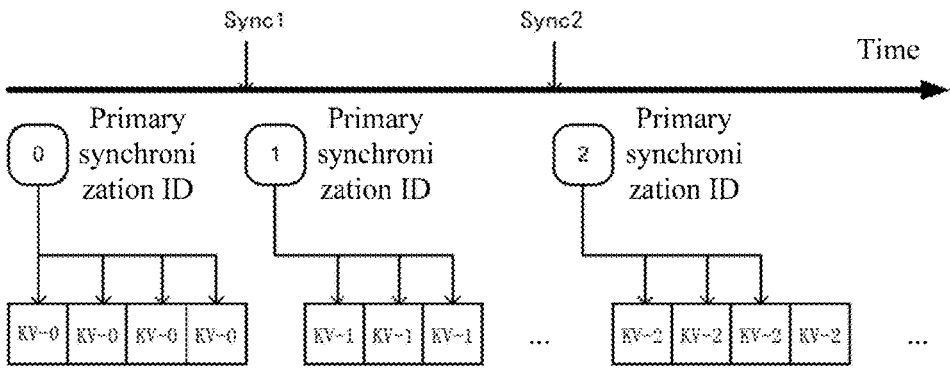
FIG. 4 shows an example of a change in a primary synchronization ID with a synchronization round.

FIG. 4 illustrates an example of a change in a primary synchronization ID with a synchronization round. In the example of FIG. 4, the primary synchronization ID has an initial value of 0, and is incremented by 1 each time. Therefore, in an initial round of data writing, a synchronization ID, namely 0, is appended to a written metadata KV pair of each user data block (for example, it is assumed that four blocks are written in the first round). After the round of data writing is completed, the primary synchronization ID is incremented to 1 by using a synchronization operation command Sync. In a second round of data writing, a synchronization ID, namely 1, is appended to each written metadata KV pair, and so on. In an (i+1)th round of data writing, a synchronization ID, namely i, is appended to each written metadata KV pair.

As such, it can be found that, whether synchronization of a KV pair and user data corresponding to the KV pair has been completed can be determined by comparing whether a synchronization ID of the KV pair is less than the primary synchronization ID. If the synchronization ID appended to the KV pair is less than the primary synchronization ID, synchronization of the KV pair definitely have been completed. If the synchronization ID is equal to the primary synchronization ID, it indicates that synchronization of the KV pair has not been completed. As such, data recovery and detection of a rollback attack become very simple. During recovery after a crash, the primary synchronization ID can be read from the above trusted persistent storage device and compared with the synchronization ID of the KV pair stored in the WAL to detect a rollback attack. All unsynchronized KV pairs can be securely discarded, thereby recovering a state of the LSM tree to a state in a synchronization operation completed last time.

In summary, at the L4 layer of the LSM tree, atomicity and irreversibility of synchronization are implemented through the synchronization ID. All data change Txs related to the LSM tree are maintained in a form of logs. The following describes maintenance of log data through the L3 layer.

Figure 5:
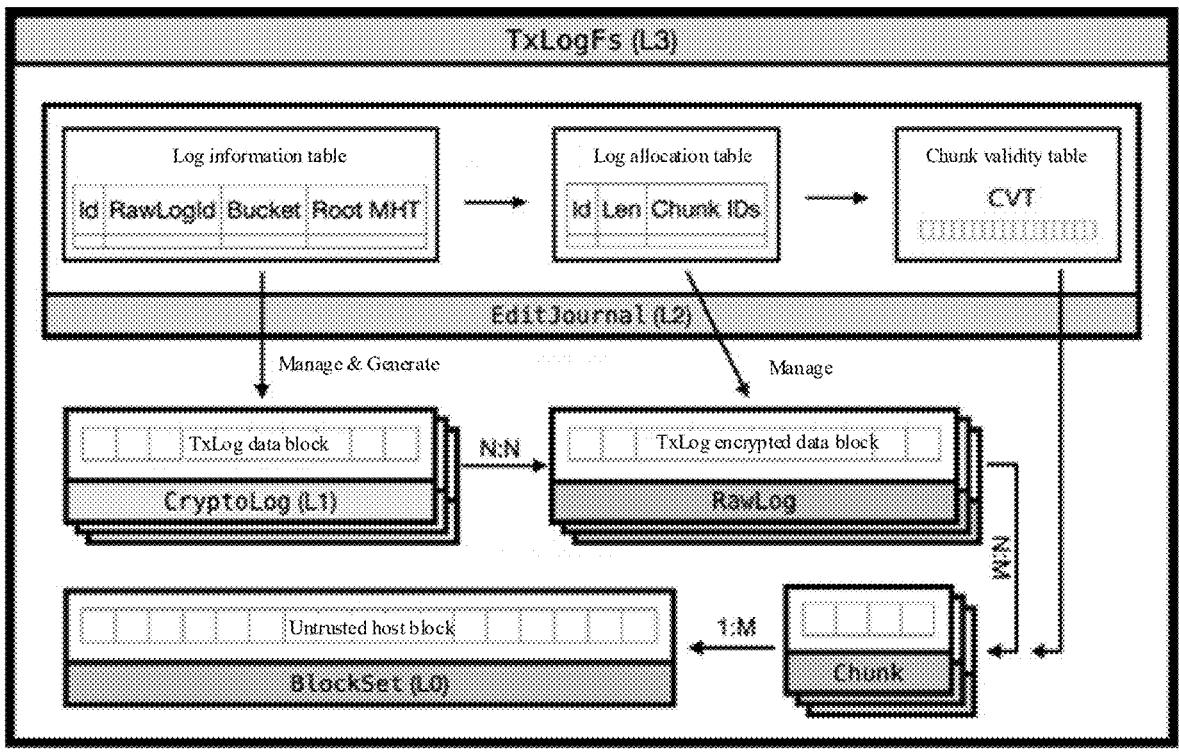
FIG. 5 is a schematic diagram illustrating a data management structure at an L3 layer of a secure disk.

FIG. 5 is a schematic diagram illustrating a data management structure at an L3 layer of a secure disk. At the L3 layer, a transactional log-oriented file system TxLogFs is provided. The Log file system is customized for needs of the secure disk.

TxLogFs supports creation, deletion, listing, reading, and writing of a log file. Managed logs include the BVT and the BAL that are involved at the L5 layer in FIG. 2, and the WAL and the SST operation Tx log that are involved at the L4 layer in FIG. 3. Each log has a unique log ID. Different types of logs are managed by using different buckets. For example, bucket 1 is used to store and identify the WAL, and bucket 2 is used to store and identify the SST operation Tx log. Further, as described above, writing of the SST is also layered. Therefore, in an example, more fine-grained buckets can be obtained through division based on layers of the SST.

Based on the application scenarios of the secure disk, the file system TxLogFs can specify one or more of the following: (1) I/O needs to be block-aligned; (2) A file is an append-only log; or (3) A file is stored in a predetermined bucket (not a dynamically created folder). In some implementations, TxLogFs is applied to a workload (<10K) that involves a relatively small number of medium-sized files (<1 GB), which can improve efficiency.

TxLogFs has built-in support for a Tx, ensuring atomicity, isolation, and durability in ACID. To minimize the probability of a conflict between TXs, the TxLogFs file system can be set as followings: (1) Concurrent TXs are prohibited from opening the same log file for writing to avoid a write conflict. (2) A delayed deletion (or referred to as lazy deletion) mechanism is employed for a log file to process concurrent deletion of TxLogs, where the mechanism can delay a real deletion opportunity of an object. Compared with deletion of a file in UNIX FS, where a file is still available for a current program that already uses the file after the file is "deleted", and the file is not really deleted until the process exits the file, the delayed deletion mechanism can be used to prevent interfering with other TXs that use a log file when the log file is deleted, thereby avoiding a deletion conflict. (3) A log is identified by an ID generated by the system, so that each log has a unique log ID to avoid a name conflict.

The following example shows a manner of maintaining data in the TxLogFs file system during data writing. As shown in FIG. 5, a log file in the TxLogFs file system is represented by a TxLog. As the user data is written into the disk, new log data is generated in the BVT and the BAL at the L5 layer and the WAL and in the SST operation Tx log at the L4 layer. When log data is appended, the disk space is allocated for the appended log data through a RawLog. The Rawlog herein can be considered as a component used to manage a log in the devicemapper, and can be considered as a log manager. In an implementation, the Rawlog can allocate a space in units of blocks. In another implementation, the Rawlog allocates a space in units of chunks. One chunk can include a fixed number of M consecutive physical blocks. For example, the fixed quantity M can be 256 physical blocks. As shown in FIG. 5, when it is determined that N blocks are needed for currently appended log data, the RawLog allocates N: M chunks from the disk. Compared with allocation in units of single blocks, space allocation in units of chunks can convert a plurality of small logical writes into a large sequential write, which has a performance advantage.

A chunk validity table (CVT) is maintained in the TxLogFs file system to record an allocation state of each block. The CVT can be in a form of a bitmap. The Rawlog queries the CVT to allocate the space, and updates the CVT after allocating several chunks to current log data.

After the Rawlog allocates the several chunks to the current log data, the current log data can be encrypted and stored in the allocated chunks. In an implementation, the log data can be encrypted in a Cryptolog format. The Cryptologe encryption format supports randomly read and encryption-protected log data. Encrypted data blocks are organized into the MHT for verification and protection.

In addition, log metadata information is maintained in the TxLogFs file system to record a storage state of log data. The Log metadata information can record basic information of each log, for example, an ID and a bucket including the log, and further records storage information of the log, for example, a chunk storing the log and encryption and authentication information. As the current log data is encrypted and stored in the allocated chunks, the log metadata information is also updated accordingly.

In an example, as shown in FIG. 5, the log metadata information includes a log information table and a log allocation table. For example, the log information table records a log ID of each log, a log bucket (corresponding to a log category), and a root value (used for data verification) of the MHT formed after encrypted storage. The Log allocation table can record the log ID, a byte length, and a chunk ID of a chunk allocated to the log.

The Log metadata information and the above CVT jointly constitute second metadata related to the log file TxLog. It can be understood that, when the log data is appended, tables in the second metadata are also updated accordingly. To ensure security of the log file, the second metadata is securely maintained in a form of a journal. A persistence state of the second metadata is stored in the journal as a series of incremental changes. A data structure of the journal is provided at an L2 layer.

Figures 6, 7:
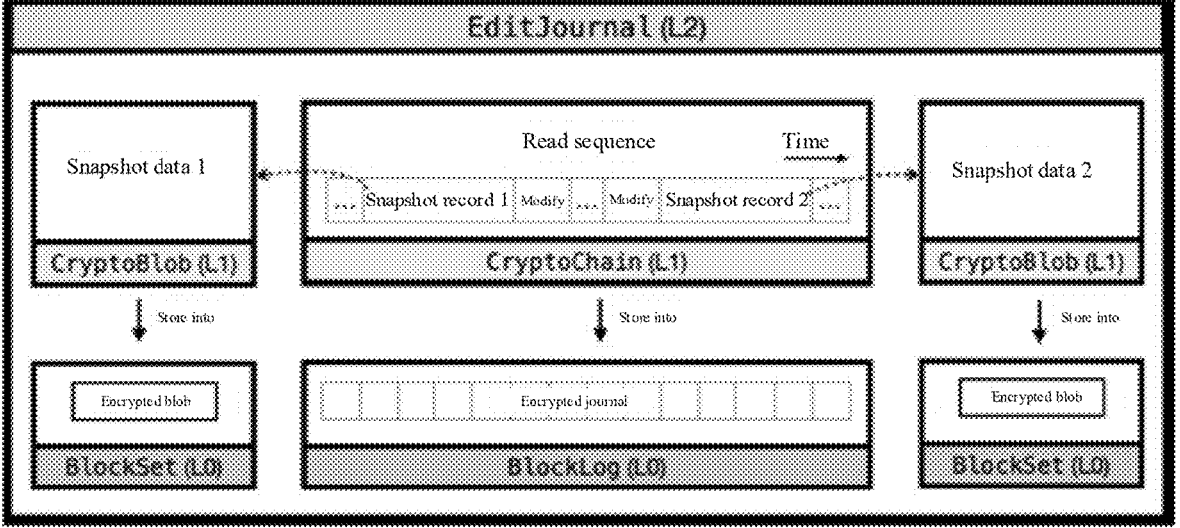
FIG. 6 is a schematic diagram illustrating a data management structure at an L2 layer of a secure disk.
FIG. 7 is a schematic diagram illustrating data storage in a secure disk according to an implementation.

FIG. 6 is a schematic diagram illustrating a data management structure at an L2 layer of a secure disk. At the L2 layer, a secure journal, referred to as an EditJournal, is provided to record a state of the second metadata. It can be understood that, compared with a text storage form of the log, the journal is a lower-level log form.

According to the EditJournal, each data update or modification of a record object (that is, the second metadata herein) is referred to as an edit. As shown in FIG. 6, the EditJournal maintains a latest state of the object by recording incremental changes corresponding to a series of edits of the object. When a number of edits exceeds a threshold, a state snapshot representing accumulation of all edits is created. After the snapshot is recorded, spaces occupied by all the edits occurred before the snapshot are no longer required and can be released. A latest snapshot together with all edits added after the snapshot represent the latest state of the record object.

Therefore, an entire journal record can be embodied as a record sequence, which includes a plurality of records arranged in time order. The plurality of records can include a most recent snapshot record and several modification records sequentially added in time order after the snapshot record, where one modification record corresponds to one edit. Correspondingly, when any one of the CVT, the log information table, and the log allocation table in FIG. 5 is updated once, a modification record related to increment content updated this time can be appended to the record sequence of journals.

In response to that a number of recent consecutive modification records reaches a predetermined threshold, a first snapshot record 1 closest to current time in the record sequence and a plurality of modification records subsequent to the first snapshot record are read, information about the plurality of modification records is accumulated on first snapshot data corresponding to the first snapshot record to generate second snapshot data, and a second snapshot record 2 is generated based on the second snapshot data and appended to the record sequence.

The record sequence of journals is encrypted in a CryptoChain format and stored in a storage area whose property is BlockLog in the disk. The CryptoChain format is chain encryption in which data blocks arranged in sequence are "linked" by storing authentication information (e.g., a MAC) of a previous block in each block. The BlockLog is one of a plurality of storage areas of the disk and is used to store encrypted data that is organized as a chain or tree.

It should be noted that although the record sequence includes the snapshot record, the snapshot record stores only metadata of a snapshot and does not store snapshot data. For example, the snapshot record stores a storage location and authentication information (e.g., a MAC) of the snapshot data, and references or points to the corresponding snapshot data. The snapshot data is encrypted in a CryptoBlob format and stored in a BlockSet storage area of the disk. The CryptoBlob format is another block-shaped encryption format that supports local update and is protected through authenticated encryption.

In some implementations, two block spaces are set in the BlockSet store to store snapshot data. Each time a new piece of snapshot data is generated, the snapshot data is written into a space whose last snapshot version is older in the two block spaces. Alternatively or additionally, snapshot data sequentially generated is alternately written into the two block spaces. For example, sequentially generated snapshot data 1 is stored in a block space 1, snapshot data 2 is stored in a block space 2, and snapshot data 3 is returned to the block space 1 for storage. This ensures that snapshot data can always be obtained to recover the latest state. Even if a block space is damaged due to a write operation/is attacked and data cannot be read, snapshot data close to the latest state can be recovered from another block space and is used together with data of the edit to recover the latest state.

In the process of writing the user data block to the disk, under support of the data structures at the layers, related metadata is written into different areas of the disk in encryption formats respectively corresponding to the layers. For example, the related metadata may include the first metadata in a form of a KV pair, the log related to the first metadata, the second metadata related to the log, and the journal corresponding to the second metadata. After these writes are completed, as shown in operation S15 in FIG. 1, the sync command is submitted to the disk. The disk persists data written before the sync command in response to the sync command.

In some implementations, different data is written into different areas of the disk at different layers in different encryption formats. For example, the L1 layer of the secure disk maintains and supports different encryption formats. The L0 layer provides partitioned storage for the disk.

For example, the L1 layer provides at least three encryption formats to ensure confidentiality, integrity, and freshness of data.

A first format is CryptoBlob representing a secure data blob, which can be updated locally and protected through identity-authenticated encryption. The snapshot data in the journal in FIG. 6 is encrypted in this encryption format.

A second format is CryptoChain, which is a chain encryption data format. Data organized in this format forms a data chain by storing authentication information (including a MAC) of a previous block in each block. The record sequence of journals in FIG. 6 is encrypted in the CryptoChain format.

A third format is CryptoLog, which is a randomly read and encryption-protected log. Encrypted data blocks in this log are organized as an MHT, and are verified and protected by the MHT. The log data in FIG. 5 is encrypted in the CryptoLog format.

As described herein, at the L0 layer, untrusted physical blocks are organized into storage areas with different properties, and data is written by using different interfaces. For example, the storage areas with different properties include a BlockSet and a BlockLog.

The BlockSet storage area is implemented by encapsulating a primary block of an OS, and a corresponding Blockset interface is configured to read or write a fixed group of non-trusted physical blocks. In some example data writing process, block-shaped encrypted data generated through authenticated encryption can be stored in the Block-Set storage area.

The BlockLog storage area organizes the untrusted physical blocks into a block sequence, and a corresponding BlockLog interface is configured to read data from and append data to the block sequence. For example, the above data encrypted in both the CryptoChain format and the CryptoLog format is stored in the BlockLog storage area.

FIG. 7 is a schematic diagram illustrating data storage in a secure disk according to an implementation. As shown in the figure, non-trusted physical blocks in the host disk are organized into two storage areas: a BlockSet and a Block-Log. Most storage spaces of the BlockSet are used to store a relatively large quantity of encrypted user data blocks, and a small part of spaces stores encrypted blobs. For example, the encrypted blob can be an encrypted block obtained by encrypting snapshot data in the CryptoBlob format shown in FIG. 6. Both the user data block and the encrypted blob are block-shaped encrypted data generated through authenticated encryption, but the encrypted data are organized differently. The encrypted blob obtained in the CryptoBlob format includes encrypted data, a version id, a MAC, and other data as a whole. The encrypted user data block includes only encrypted data, and authentication information such as a MAC is stored in the KV pair shown in FIG. 2 and written into the LSM tree.

The BlockLog is used to store a journal encrypted in a CryptoChain format and a log encrypted in a CryptoLog format.

Based on the above descriptions of the data structures and the processing processes at the L5 layer to the L0 layer, abstract data structures, data features, and security that are provided at the layers of the secure disk can be shown in the following Table 1.

TABLE 1

| Layer | Layer name | Abstract structure | Description | IO unit | Security |
|-------|-----------|-------------------|-------------|---------|----------|
| L5 | Trusted block IO layer | Secure disk | Secure virtual disk | Logical block | CIFCAI |
| L4 | Tx LSM tree layer | TxLsm tree | Tx-safe LSM tree | KV pair | CIFCAI |
| L3 | Tx log file layer | TxlogFs | Log file system | Log file | CIFCA |
|  |  | Txlog | Secure log file |  |  |
| L2 | Journal layer | EditJournal | Secure journal | Journal record | CIFCA |
| L1 | Encryption format layer | CryptoChain | Encrypted logs organized as a chain and capable of being scanned only | Block/blob | CIF |
|  |  | CrytoLog | Encrypted logs organized as a tree and randomly read |  |  |
| L0 | Untrusted block IO layer | BlockSet | Set of untrusted blocks | Host block | None |
|  |  | BlockLog | Sequence of untrusted blocks |  |  |

CIFCAI in Table 1 is an abbreviation of the following security factors: confidentiality, integrity, freshness, consistency, atomicity, and irreversibility.

It can be seen from Table 1 that, for each layer, an upper-layer and a more abstract data structure is organized based on an abstract data structure provided at a lower layer, and a more advanced storage function and/or higher security attribute are/or is added, thereby achieving that layer by layer, a higher layer has a higher level of security and a higher level of functionality than a lower layer. It can be verified that the secure disk implemented in such a hierarchical manner can satisfy core security requirements for data: write confidentiality and read correctness, and have comprehensive CIFCAI security. In addition, the secure disk solution can resist a rollback attack. Defense against the rollback attack can be illustrated more clearly through a data recovery process.

FIG. 8 is a flowchart illustrating a data recovery process based on a secure disk according to an implementation. Data recovery usually occurs when a host is down or crashed for various reasons. In this case, data in a memory is lost, some data may not have been written into a disk, and a synchronization process of the disk may not have fully completed. This may cause data inconsistency. Therefore, the secure disk in the implementations of the present specification can provide a secure data recovery process, and a purpose of the data recovery is to recover all data maintained by the system to a state in a previous complete synchronization operation. As shown in FIG. 8, the data recovery process includes the following operations.

After the host is down and restarted, first, in operation S81, a first metadata table maintained by using an LSM tree is recovered from the disk, where the first metadata table records first metadata corresponding to each user data block, and a single piece of first metadata includes an LBA, an HBA, and authentication information of the user data block, and is appended with a synchronization ID.

In operation S82, first metadata whose synchronization is not completed is determined based on the synchronization ID in each piece of first metadata.

In operation S83, related data of the first metadata whose synchronization is not completed.

For example, the first metadata table is maintained by using the LSM tree. During writing for the LSM tree, a KV pair is first buffered in a MemTable of the memory, and may be lost as the host is down. Therefore, in an implementation, a WAL is recovered from the disk to recover each piece of first metadata in the first metadata table.

To recover the WAL, in an implementation, snapshot data can be read from a predetermined block space in a first disk (BlockSet), and a record sequence of encrypted journals can be read from a second disk (BlockLog) (as shown in FIG. 6). In an implementation, as shown in FIG. 6, snapshot data sequentially generated is stored alternately by using two block spaces. As such, reading the snapshot data is, in some implementations, reading latest snapshot data. If a block space for storing most recent snapshot data cannot be read, second latest snapshot data is read from another block space.

Then, latest second metadata is recovered by using the snapshot data and the record sequence that are read. As described above, the second metadata is metadata related to a log file TxLog, and includes Log metadata information that records a storage state of log data. For example, the log metadata information includes the log information table and the log allocation table shown in FIG. 5. Therefore, a storage location of each log constituting the WAL in the disk can be determined based on the log metadata information in the recovered second metadata, so that the WAL is read from the disk. Therefore, each metadata KV pair in the first metadata table can be obtained by using the WAL.

In operation S82, a current primary synchronization ID is read from a trusted storage medium, and the current primary synchronization ID is compared with the synchronization ID in each piece of first metadata.

As previously described with reference to FIG. 3, when the first metadata (that is, metadata KV pairs) is added to the LSM tree, each metadata KV pair is appended with a current value of the primary synchronization ID as a synchronization ID before being added to the Memtable and the WAL, and the primary synchronization ID is stored in a separate trusted storage medium and incremented after each synchronization command. As such, it can be found that, whether synchronization of a KV pair and user data corresponding to the KV pair has been completed can be determined by comparing whether a synchronization ID of the KV pair is less than the primary synchronization ID. If the synchronization ID appended to the KV pair is less than the primary synchronization ID, synchronization of the KV pair definitely have been completed. If the synchronization ID is equal to the primary synchronization ID, it indicates that synchronization of the KV pair has not been completed.

In operation S82, first metadata whose synchronization ID is equal to the primary synchronization ID can be determined as the first metadata whose synchronization is not completed. Correspondingly, in operation S83, the related data of the first metadata whose synchronization is not completed is discarded. This includes discarding unsynchronized KV pairs, so that the LSM tree is recovered to a state occurred after last synchronization is completed. In addition, in some implementations, other data related to the KV pairs can be further discarded, e.g., corresponding user data blocks, related logs added to these KV pairs, and second metadata.

Through the above process, a rollback attack can be detected, and after the host crashes, disk data can be securely recovered to a state occurred after previous synchronization.

According to an implementation in an aspect, a data reading method is further provided. FIG. 9 is a flowchart illustrating a data reading method according to an implementation. As shown in FIG. 9, the reading process includes the following operations.

In operation S91, a read request is received, where the read request includes a target LBA. The target LBA is an LBA of a data block specified by a user (upper-layer file system) to be read.

In operation S92, a first metadata table is queried by using the target LBA as a key to read target metadata, where the target metadata further includes a target HBA and target authentication information. The first metadata table is maintained by using an LSM tree, and records first metadata corresponding to each user data block. In an implementation, the target authentication information can include an encryption key sk and a MAC.

In operation S93, an encrypted data block is read from a disk based on the target HBA, and the encrypted data block is decrypted and authenticated based on the target authentication information to obtain the user data block.

As such, user data is read correctly and securely.

Figure 10:
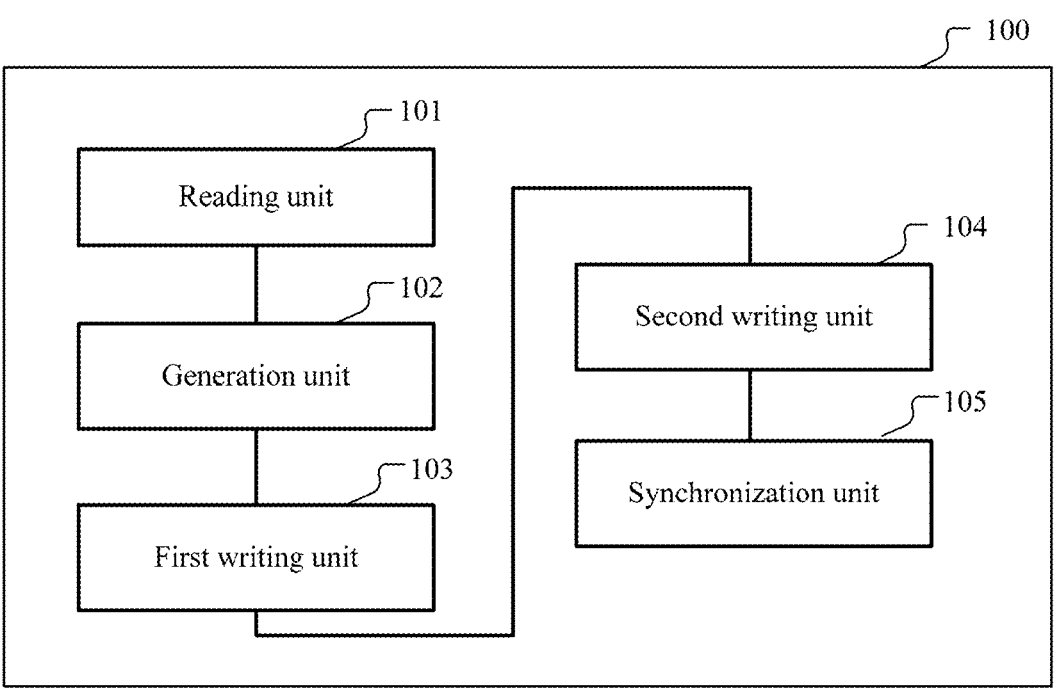
FIG. 10 is a schematic diagram illustrating a structure of a data writing apparatus according to an implementation.

According to an implementation in still an aspect, a data writing apparatus is provided, that is, a logical part of a secure virtual disk that is configured to write data. FIG. 10 is a schematic diagram illustrating a structure of a data writing apparatus according to an implementation. As shown in FIG. 10, the writing apparatus 100 includes: a reading unit 101, configured to read a plurality of user data blocks in a write cache under a predetermined trigger condition, where each user data block is identified by an LBA of the user block; a generation unit 102, configured to: for each user data block, allocate an HBA to the user data block, perform authenticated encryption on the user data block to generate an encrypted data block and authentication information, and generate first metadata corresponding to the user data block, where the first metadata is organized in a form of a KV pair and includes the LBA, the HBA, and the authentication information; a first writing unit 103, configured to submit a plurality of write commands for the plurality of user data blocks to a host disk for the disk to store the encrypted data block in a first storage area of the disk based on the corresponding HBA; a second writing unit 104, configured to write the first metadata corresponding to each user data block into a first metadata table maintained by using an LSM tree; and a synchronization unit 105, configured to send a synchronization operation command to the LSM tree and the host disk for the LSM tree and the host disk to complete data write persistence.

For an execution manner of each unit in the writing apparatus, references can be made to the above description of the data writing process provided with reference to FIG. 1 to FIG. 7. Details are omitted herein for simplicity.

Figure 11:
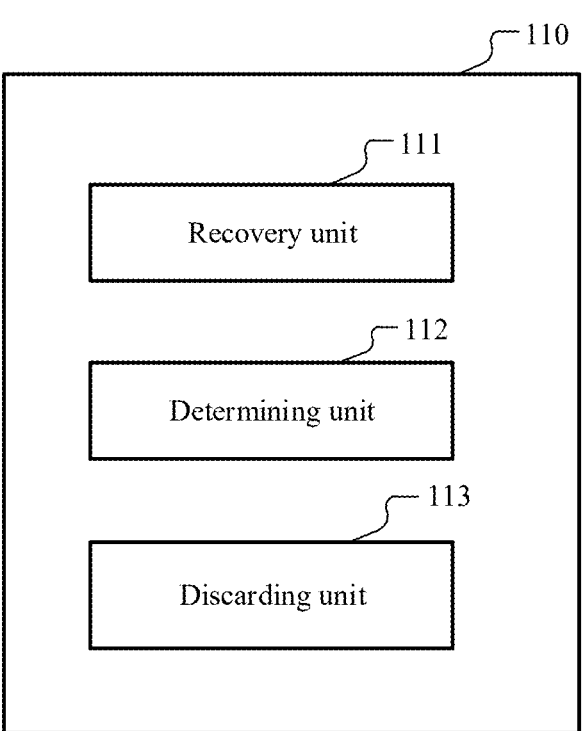
FIG. 11 is a schematic diagram illustrating a structure of a data recovery apparatus according to an implementation.

According to an aspect, a data recovery apparatus is further provided, that is, a logical part of a secure virtual disk that is configured to perform data recovery. FIG. 11 is a schematic diagram illustrating a structure of a data recovery apparatus according to an implementation. As shown in FIG. 11, the recovery apparatus 110 can include: a recovery unit 111, configured to recover, from a disk, a first metadata table maintained by using an LSM tree, where the first metadata table records first metadata corresponding to each user data block, and each piece of first metadata includes an LBA, an HBA, and authentication information of the user data block, and is appended with a synchronization ID; a determining unit 112, configured to determine, based on the synchronization ID in each piece of first metadata, first metadata whose synchronization is not completed; and a discarding unit 113, configured to discard related data of the first metadata whose synchronization is not completed.

For an execution manner of each unit in the recovery apparatus, references can be made to the above description of the data recovery process provided with reference to FIG. 8. Details are omitted herein for simplicity.

According to still an aspect, a data reading apparatus is further provided, that is, a logical part of a secure virtual disk that is configured to read data. The reading apparatus can include: a receiving unit, configured to receive a read request, where the read request includes a target LBA; a querying unit, configured to query a first metadata table by using the target LBA as a key to read target metadata, where the target metadata further includes a target HBA and target authentication information, and the first metadata table is maintained by using an LSM tree and records metadata corresponding to each user data block; and an acquisition unit, configured to read an encrypted data block from a disk based on the target HBA, and decrypt and authenticate the encrypted data block based on the target authentication information to obtain the user data block.

According to an implementation in yet an aspect, a computing device is further provided, including a storage and a processor. The computing device forms a confidential computing architecture, and the confidential computing architecture includes a secure world, a domain world, a non-secure world, and a root world. The root world includes the above root monitor.

A person skilled in the art should be aware that, in the above one or more examples, the functions described in the present invention can be implemented by hardware, software, firmware, or any combination thereof. When software is used for implementation, these functions can be stored in a computer-readable medium or transmitted as one or more instructions or codes on the computer-readable medium.

The characteristics, technical solutions, and beneficial effects of the present invention are further described in detail in the above specific implementations. It should be understood that the above descriptions are merely specific implementations of the present invention, but are not intended to limit the protection scope of the present invention. Any modification, equivalent replacement, or improvement made based on the technical solutions in the present invention shall fall within the protection scope of the present invention.

What is claimed is:

1. A data writing method, comprising:
   reading a plurality of user data blocks in a write cache under a trigger condition, each user data block including a logical block address (LBA) of the user data block;
   for each user data block,
       allocating a host block address (HBA) to the user data block,
       performing authenticated encryption on the user data block to generate an encrypted data block and authentication information, and
       generating first metadata corresponding to the user data block, the first metadata including a key-value (KV) pair and including the LBA, the HBA, and the authentication information;
   submitting a plurality of write commands for the plurality of user data blocks to a disk for the disk to store the encrypted data block in a first storage area of the disk based on the corresponding HBA;
   writing the first metadata corresponding to each user data block into a first metadata table maintained by using a log-structured merge (LSM) tree; and
   sending a synchronization operation command to the LSM tree and the disk for the LSM tree and the disk to complete data write persistence.

2. The method according to claim 1, wherein the trigger condition includes: the write cache is full, or an instruction for performing a synchronization operation is received.

3. The method according to claim 1, wherein the authentication information includes an encryption key and a message authentication code (MAC).

4. The method according to claim 1, wherein the allocating the HBA to the user data block includes:
   searching for and modifying block allocation information that records an allocation state of a block space in the disk, wherein the block allocation information is recorded in a form of a log.

5. The method according to claim 4, wherein the block allocation information includes a block validity table (BVT) in a form of a bitmap and a block allocation log, and pieces of the block allocation log are periodically merged to update the BVT.

6. The method according to claim 1, wherein the writing the first metadata into the first metadata table maintained by using the LSM tree includes:
   obtaining a current value of a primary synchronization identifier (ID) as a synchronization ID, wherein the primary synchronization ID is set to be incremented in response to the synchronization operation command; and
   writing the first metadata appended with the synchronization ID into a write-ahead log (WAL), and inserting the first metadata into the LSM tree, wherein the LSM tree performs a sorted string table (SST) operation transaction (Tx) in response to the data insertion, to generate an operation Tx log.

7. The method according to claim 6, wherein the primary synchronization ID is stored in a trusted persistent storage medium independent of the disk.

8. The method according to claim 6, wherein the writing the first metadata into the first metadata table maintained by using the LSM tree includes:
   allocating a data chunk from the first storage area for target log data in a form of a log, wherein the target log data includes at least one of: the WAL, the operation Tx log, or block allocation information that is used to record an allocation state of a block space in the disk and that is used when the HBA is allocated to each user data block; and
   encrypting and storing the target log data in the allocated data chunk, and updating second metadata related to the log, wherein the second metadata includes log metadata information that records a storage state of log data and a chunk validity table (CVT) that records an allocation state of each chunk.

9. The method according to claim 8, wherein the log metadata information includes a log information table and a log allocation table, the log information table records at least a log ID and a log category, and the log allocation table records at least a log ID and an ID of a chunk allocated to a log.

10. The method according to claim 8, wherein the encrypting and storing the target log data in the allocated data chunk includes:
   encrypting the target log data in a first encryption format and storing the target log data as encrypted in a second storage area of the disk, wherein the first encryption format includes organizing data ciphertext in a form of a Merkle tree (MHT).

11. The method according to claim 8, wherein the second metadata is recorded in a form of a journal, wherein the journal includes a record sequence of a plurality of records arranged in time order; and
   the updating the second metadata related to the log includes:
       appending a modification record related to incremental content updated this time to the record sequence.

12. The method according to claim 11, wherein the journal is stored in a second storage area of the disk in a second encryption format, wherein the second encryption format is chain encryption, and each of data blocks arranged in sequence stores authentication information of a previous data block.

13. The method according to claim 11, wherein the updating the second metadata related to the log further includes:
   in response to that a number of recent consecutive modification records reaches a threshold,
       reading a first snapshot record closest to current time in the record sequence and several modification records subsequent to the first snapshot record,
       accumulating information about the several modification records on first snapshot data corresponding to the first snapshot record to generate second snapshot data,
       generating a second snapshot record based on the second snapshot data, and
       appending the second snapshot record to the record sequence.

14. The method according to claim 13, wherein the first snapshot data is encrypted and stored in a first block space in the first storage area; and
   the updating the second metadata related to the log further includes:

encrypting and storing the second snapshot data in a second block space in the first storage area, wherein the second block space is different from the first block space.

15. The method according to claim 13, wherein the generating the second snapshot record based on the second snapshot data includes:

obtaining third metadata of the second snapshot data, and generating the second snapshot record based on the third metadata, wherein the third metadata includes a storage location and authentication information of the second snapshot data.

16. The method according to claim 1, wherein the write cache is a memory segment located in a trusted execution environment (TEE).

17. The method according to claim 1 comprising:

recovering, from the disk, the first metadata table maintained by using the LSM tree, the first metadata table being appended with a synchronization identifier (ID);

determining, based on the synchronization ID in each piece of first metadata, first metadata whose synchronization is not completed; and discarding related data of the first metadata whose synchronization is not completed.

18. The method according to claim 17, wherein the recovering, from the disk, the first metadata table maintained by using the LSM tree includes:

reading snapshot data from a predetermined block space in a first storage area of the disk, and reading a record sequence of encrypted journals from a second storage area;

recovering latest second metadata by using the snapshot data and the record sequence, wherein the second metadata includes log metadata information that records a storage state of log data; and determining, based on the recovered log metadata information, a storage location of each log constituting a WAL in the disk, to read the WAL from the disk, wherein the WAL records each piece of first metadata in the LSM tree.

19. The method according to claim 17, wherein the determining the first metadata whose synchronization is not completed includes:

reading a current primary synchronization ID from a trusted storage medium, and comparing the current primary synchronization ID with the synchronization ID in each piece of first metadata; and determining first metadata whose synchronization ID is equal to the primary synchronization ID as the first metadata whose synchronization is not completed.

20. The method according to claim 1, comprising:

receiving a read request, the read request including a target LBA;

querying the first metadata table by using the target LBA as a key to read target metadata, the target metadata further including a target HBA and target authentication information; and reading an encrypted data block from the disk based on the target HBA, and decrypting and authenticating the encrypted data block based on the target authentication information to obtain the user data block.

21. A computing system comprising one or more processors and one or more storage devices, the one or more storage devices, individually or collectively, having computer executable instructions stored thereon, the computer executable instructions, when executed by the one or more processors, enabling the one or more processors to, individually or collectively, implement actions including:

reading a plurality of user data blocks in a write cache under a trigger condition, each user data block including a logical block address (LBA) of the user data block;

for each user data block, allocating a host block address (HBA) to the user data block, performing authenticated encryption on the user data block to generate an encrypted data block and authentication information, and generating first metadata corresponding to the user data block, the first metadata including a key-value (KV) pair and including the LBA, the HBA, and the authentication information;

submitting a plurality of write commands for the plurality of user data blocks to a disk for the disk to store the encrypted data block in a first storage area of the disk based on the corresponding HBA;

writing the first metadata corresponding to each user data block into a first metadata table maintained by using a log-structured merge (LSM) tree; and sending a synchronization operation command to the LSM tree and the disk for the LSM tree and the disk to complete data write persistence.

22. The computing system according to claim 21, wherein the actions include:

recovering, from the disk, the first metadata table maintained by using the LSM tree, the first metadata table being appended with a synchronization identifier (ID);

determining, based on the synchronization ID in each piece of first metadata, first metadata whose synchronization is not completed; and discarding related data of the first metadata whose synchronization is not completed.

23. The computing system according to claim 21, wherein the actions include:

receiving a read request, the read request including a target LBA;

querying the first metadata table by using the target LBA as a key to read target metadata, the target metadata further including a target HBA and target authentication information; and reading an encrypted data block from the disk based on the target HBA, and decrypting and authenticating the encrypted data block based on the target authentication information to obtain the user data block.

24. A non-transitory storage medium having computer executable instructions stored thereon, the computer executable instructions, when executed by one or more processors, enabling the one or more processors to, individually or collectively, implement actions including:

reading a plurality of user data blocks in a write cache under a trigger condition, each user data block including a logical block address (LBA) of the user data block;

for each user data block, allocating a host block address (HBA) to the user data block, performing authenticated encryption on the user data block to generate an encrypted data block and authentication information, and generating first metadata corresponding to the user data block, the first metadata including a key-value (KV) pair and including the LBA, the HBA, and the authentication information;

submitting a plurality of write commands for the plurality of user data blocks to a disk for the disk to store the encrypted data block in a first storage area of the disk based on the corresponding HBA;

writing the first metadata corresponding to each user data block into a first metadata table maintained by using a log-structured merge (LSM) tree; and sending a synchronization operation command to the LSM tree and the disk for the LSM tree and the disk to complete data write persistence.

* * * * *